E. B. NELSON.
HAY OR STRAW SPEAR.
APPLICATION FILED MAY 28, 1913.
1,071,947.
Patented Sept. 2, 1913.
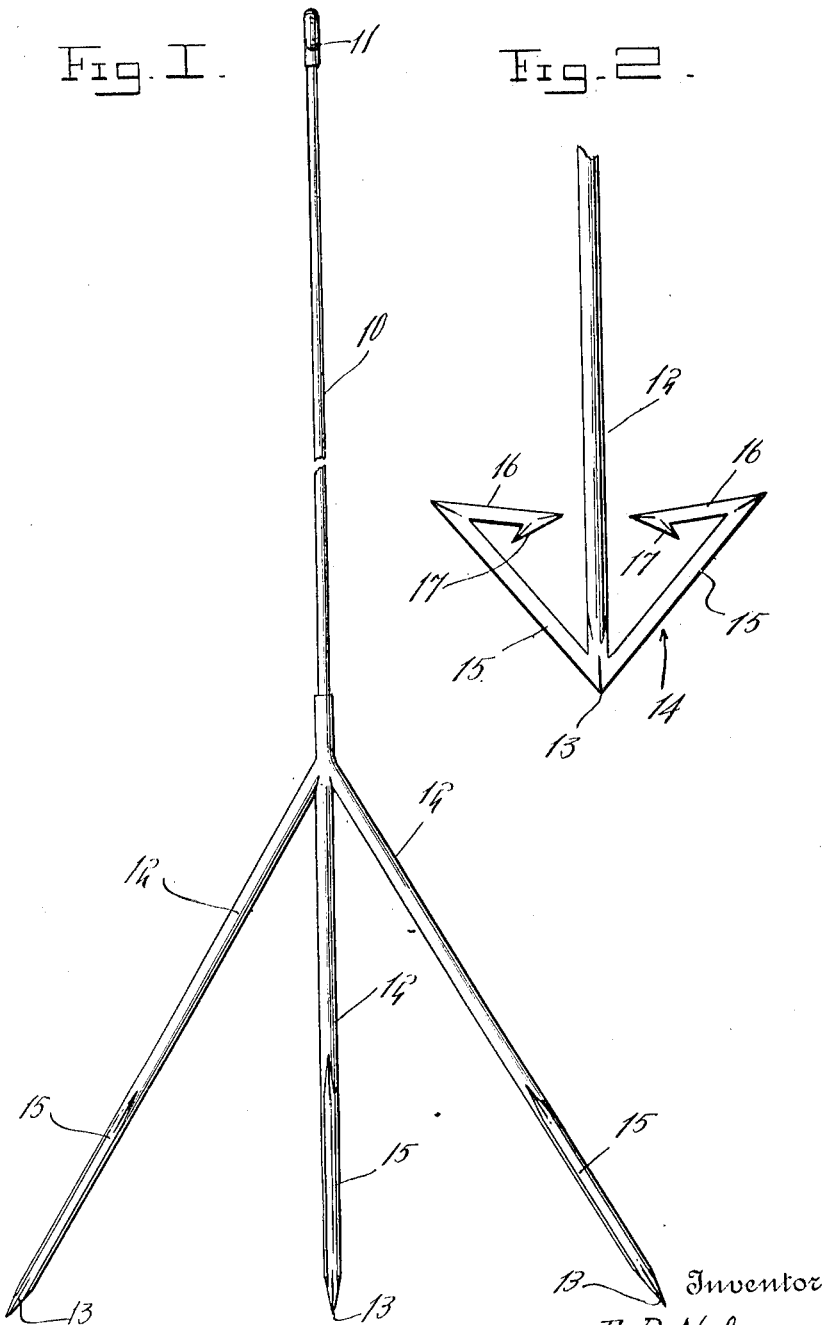

UNITED STATES PATENT OFFICE.

EMMA B. NELSON, OF VERNON CENTER, MINNESOTA.

HAY OR STRAW SPEAR.

1,071,947.  Specification of Letters Patent.  Patented Sept. 2, 1913.

Application filed May 28, 1913. Serial No. 770,548.

*To all whom it may concern:*

Be it known that I, EMMA B. NELSON, a citizen of the United States, residing at Vernon Center, in the county of Blue Earth, State of Minnesota, have invented certain new and useful Improvements in Hay or Straw Spears; and I do hereby declare the following to be a full, clear, and exact description of the invention, such as will enable others skilled in the art to which it appertains to make and use the same.

This invention relates to harvesting implements, and particularly to hay and straw handling devices.

The particular object of the invention is to provide a device in the semblance of a fork which can be driven into the hay or straw stack and which will bring with it a large quantity of hay or straw when withdrawn from the stack.

Another object is to so form the device that the same can be easily driven into the stack.

Other objects and advantages will be apparent from the following description when taken in connection with the accompanying drawings.

In the drawings: Figure 1 is a side elevation of my device, and Fig. 2 is a side elevation of one of the prongs of the device.

Referring particularly to the accompanying drawings, 10 represents a handle or shank, which is provided with a loop or eye 11 which permits the device to be suspended when not in use. Secured to the opposite end of the shank 10 are the three diverging arms 12, these arms being all of the same length and having their extremities sharpened as indicated at 13. The outer end portion of each of the arms 12 has an arrow-like head 14 which includes the arms 15 formed integrally with the sharpened point 13, these arms diverging rearwardly from the point. The rear end of each of the arms 15 has an inwardly directed portion 16 which extends toward the arm 12, the inner free end of which has a barb 17. The arrow head is sharpened and pointed at the intersections of the portions 16 with the arms 15 and also at the points where the barbs are formed.

In using the device, the shank 10 is grasped in the hands and the arrow heads driven into the straw or hay stack, the hay or straw will close around the arms 12 and when the same is withdrawn from the stack, the portions 16 will support a large quantity of the hay or straw which can be lifted or conveyed to any suitable point.

The advantage of the arrow heads will be readily apparent when compared with the ordinary hay fork, in that the device of applicant's will withdraw and support a much greater amount of hay or straw with less labor.

The device may also be used for transferring hay or straw by attaching the ring 11 to an elevating device, so that the operator can drive the spear into the mass of hay or straw and then by means of the elevator the attached material can be lifted and carried to any desired point.

What is claimed is:

A hay spear, comprising a shank, a plurality of diverging arms mounted on one end of the shank, said arms being arranged in the same plane, arrow heads formed on the outer ends of the said arms, each of said arrow heads including rearwardly diverging members having inwardly directed barbed portions, all of the angles of said arrow heads being sharpened.

In testimony whereof, I affix my signature, in the presence of two witnesses.

EMMA B. NELSON.

Witnesses:
A. W. PETRICH,
HOBERT W. PETRICH.

Copies of this patent may be obtained for five cents each, by addressing the "Commissioner of Patents, Washington, D. C."